Patented June 22, 1948

2,443,766

UNITED STATES PATENT OFFICE 2,443,766

FIRE-RESISTANT DUST COLLECTING COMPOSITIONS

Carl W. J. Hedberg, Bound Brook, N. J., assignor to Research Corporation, New York, N. Y., a corporation of New York No Drawing. Application October 24, 1945, Serial No. 624,326

2 Claims. (Cl. 106—15)

This invention relates to liquid compositions for coating the collecting surfaces of gas cleaning apparatus such as electrical precipitators and air filters.

A liquid composition suitable for the coating or flushing of dust collecting surfaces should provide a special combination of properties which is not readily obtainable. They should have a low vapor pressure at ordinary temperatures. They should have a sufficient viscosity to maintain a substantial film on the collecting surfaces but should also flow readily. They should quickly wet both the collecting surfaces and the particles collected thereby. They should be relatively fire-resistant and should decrease the flammability of the collected particles. They should also be readily soluble in inexpensive flushing and diluting media.

A purpose of the invention is the provision of a fire-resistant, dust-collecting liquid composition suitable for coating collecting surfaces having the properties outlined above.

I have found that a highly advantageous dust collecting coating composition is provided by a mixture of substantial proportions of an aliphatic polyhydroxy compound, such as the sugars and the polyhydroxy alcohols, and a dihydric alcohol, such as triethylene glycol or propylene glycol. The mixture may be diluted to suitable viscosity with water and a wetting agent, such as an alkylated aromatic sulfonate, a long-chain alcohol sulfate, or an alkanolamine fatty acid salt, is preferably added in small amount.

The following are examples of fire-resistant, dust collecting liquid coating compositions of the invention:

|   | Parts |
|---|---|
| 1. Sorbitol | 1 |
| Triethylene glycol | 1 |
| Water | 1 |
| Wetting agent in small amount. | |
| 2. Sorbitol | 1 |
| Triethylene glycol | 2 |
| Water | 1 |
| Wetting agent in small amount. | |
| 3. Sorbitol | 2 |
| Propylene glycol | 1 |
| Water | 1 |
| Wetting agent in small amount. | |

In the above examples, the sorbitol may be replaced by other polyhydroxy compounds, such as dextrose, sugar (molasses), invert sugar and the like.

The compositions of the invention readily wet metallic surfaces and deposited dusts, and can be easily flushed from the surfaces with water, they will not support combustion, they remain liquid and homogeneous at low temperatures, and, due to the presence of the glycols, they have germicidal properties.

In general, the proportion of the dihydric alcohol should not exceed about twice or be less than about one-half of the amount of the polyhydroxy compound. The proportion of water is adjusted to provide a suitable viscosity for coating the collecting surfaces and, in general, sufficient water is used to result in compositions having a specific gravity of from about 1.15 to 1.2. The amount of wetting agent when used is, in general, less than 1% of the mixture, preferably from 0.1 to 0.5%.

When used for coating the collecting plates of an air-cleaning electrical precipitator, for example, the plates may be coated with the composition by spraying or dipping. After the precipitator has been in use for a fixed period, or when inspection indicates the collection of a substantial amount of dust, the plates are flushed with water which is drained to a collecting sump or to waste. After draining, the plates are again coated with the composition.

I claim:

1. A fire-resistant, water-soluble, dust collecting composition consisting of a glycol and sorbitol in proportions within the range 1:2 to 2:1 diluted with water to a specific gravity of from about 1.15 to about 1.2 and containing from about 0.1% to about 1% of a wetting agent.

2. A fire-resistant, water-soluble, dust collecting composition consisting of triethylene glycol and sorbitol in proportions within the range 1:2 to 2:1 diluted with water to a specific gravity of from about 1.15 to about 1.2 and containing from about 0.1% to about 1% of a wetting agent.

CARL W. J. HEDBERG.

REFERENCES CITED

The following references are of record in the file of this patent:

UNITED STATES PATENTS

| Number | Name | Date |
|---|---|---|
| 2,347,031 | Cupery | Apr. 18, 1944 |
| 2,342,150 | Kleinicke | Feb. 22, 1944 |
| 2,292,097 | Vollmer | Aug. 4, 1942 |
| 2,255,515 | Popper | Sept. 9, 1941 |
| 1,900,014 | Graves | Mar. 7, 1933 |
| 842,636 | Dressler | Jan. 29, 1907 |

OTHER REFERENCES

Perfumery & Essential Oil Record, July 1943, pages 203–204.